E. B. KILLEN.
TIRE FOR VEHICLE WHEELS.
APPLICATION FILED APR. 4, 1907.
988,640.
Patented Apr. 4, 1911.
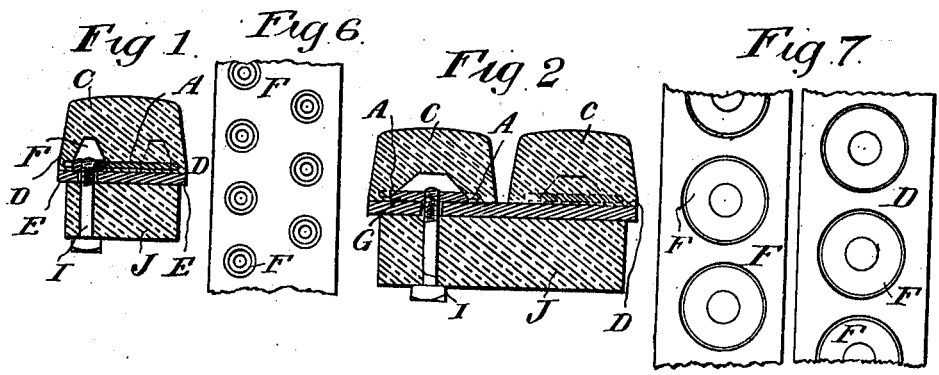
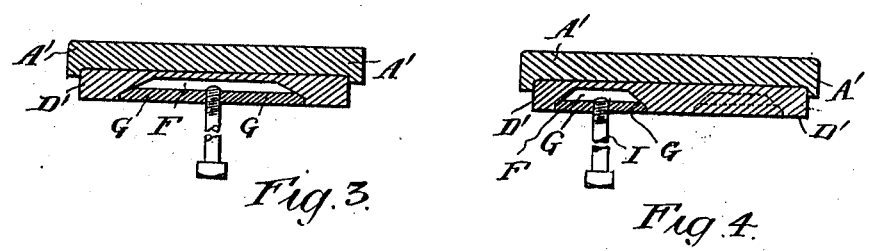
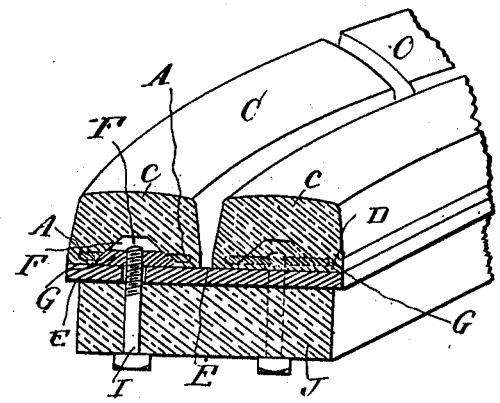

UNITED STATES PATENT OFFICE.

EDWARD BRICE KILLEN, OF LONDON, ENGLAND.

TIRE FOR VEHICLE-WHEELS.

988,640.  Specification of Letters Patent.  Patented Apr. 4, 1911.

Application filed April 4, 1907. Serial No. 366,386.

*To all whom it may concern:*

Be it known that I, EDWARD BRICE KILLEN, of 52 Queen Victoria street, London, England, engineer, have invented a certain new and useful Tire for Vehicle-Wheels, of which the following is a specification.

This invention relates to improvements in and connected with rubber treads or tires for wheels.

In order that my invention may be properly understood and readily carried into effect, I have hereunto appended one sheet of drawings, of which—

Figures 1, 2, 3, 4 and 5 are sections of parts of different forms of rubber treads. Figs. 6 and 7 are plans of parts of different forms of rubber treads.

My invention relates to tires having embedded metal binding rim or rims A, (see Figs. 1, 2, and 5). In the arrangement shown in Figs. 3 and 4 an outer rim A' overlies the resilient rim D'.

The tires may be of rubber from the outer treading periphery C to the inner bearing face D (see Figs. 1, 2, 5) or they may be of rubber only along the inside bearing face D (see Figs. 3 and 4), provided that the base portion D of the rubber is of sufficient thickness to be fitted in an efficient manner under compression, over the rim proper E of the wheel to prevent any creeping between the outer tire and the wheel proper, and without the tire coming off.

Although the tires according to my invention, are especially applicable for bus tires and those used for heavy traffic, they are also advantageous for use in lighter traffic.

It has heretofore been proposed to provide a tire constructed along these general lines but wherein it was necessary to employ a sustaining rim encircling the tire and provided at intervals throughout its circumference with perforations through which projected portions of the rubber tire. In the present case, however, this sustaining rim is dispensed with and in lieu thereof the tire proper is constructed circumferentially continuous and with an unbroken or uninterrupted tread. By practical demonstration this has been found to be equally as efficient as in the former instance, and there is the further advantage that the cost of the sustaining rim is eliminated and a more simple and neat appearing tire presented.

By the use of my present invention, the present steel binding or binding rim or rims or their equivalents hitherto used in some tires may be dispensed with, but the base D, of the tire instead of being formed in a solid mass of rubber which is practically non-elastic internally as constructed and attached for heavy traffic to-day, and which mass of rubber is strained in action beyond its elastic limit, and therefore deteriorates from the first day it is attached over a wheel proper, is made elastic at its base with a limited thickness of rubber in its cross section which base D can spread out both externally and internally when attached in position over a wheel proper, see Figs. 1, 2, 3, 4, 5, 6 and 7, not only preventing such deterioration in action, but also adding to the tire's efficiency as an absorber of vibration, and preventing the rubber becoming hard as a result of long continued compression and generation of great heat.

According to my present invention I provide a plurality of recesses F in the base circumference D of the tire preferably in zig-zag (see Figs. 6 and 4) or equivalent position at say about ¾ of an inch (or more as required) apart from each other so as to get the equivalent of almost a continuous air space or spreading room in the center of the base of tire, and I close some or all of the open bases of the air spaces F with suitable detachable or loose disks or washers G, see Figs. 1, 2, 3, 4 and 5 in some or all of which disks or washers G, I tap or make screw holes to take the tops of suitable screw bolts I. The said disks or washers G fit tightly and suitably into said air spaces F and are fitted therein before the tire is fitted on under compression.

When the tire is fitted in proper position, over wheel proper I pass suitable screw bolts I right through the felly J and steel binding rim E of wheel proper, or through the steel treading rim of a metal wheel screwing the ends of said bolts home into such of the tapped embedded disks or washers G as have been provided with suitable screw holes, thereby making creeping or movement of the tire on the wheel proper impossible, and efficiently attaching or holding the elastic rubber ring base D of the tire rigidly on the wheel proper, and giving at the same time the required space in the base D, or inner circumference of the tire to enable the rubber in the tire itself to stretch under load or heavy shocks.

Instead of molding the spaces in zig-zag or equivalent positions as described above, and shown in Figs. 6 and 4 I may mold or make the spaces in a line in each part of a double tire, i. e., in the two separate rings of the double tire, and so place the rings over the same wheel that the holes of one tread occupy a position in the middle between the holes of the other tread, see Figs. 2, 5 and 7, or I can make a single row of air spaces F in a tire if required, see Fig. 3.

In these treads or tires I prefer that the rubber should be molded so that the base D is one continuous piece of rubber forming when in position on the wheel a truly circular ring, but if required the base can be made in sections provided said sections are so attached to the wheel proper that they can not be pulled out of their positions under wear and tear.

Claims.

1. The combination with the felly and rim of a vehicle wheel, of a tire therefor comprising a resilient tread body having a plurality of recesses on the inner periphery thereof and overlying the wheel rim, washers seated within said recesses, and bolts passing through the felly and rim, and secured to said washers.

2. The combination with the felly and rim of a vehicle wheel, of a tire therefor comprising a resilient tread body having a plurality of recesses on the inner periphery thereof and overlying the wheel rim, said recesses being of substantially conical design, washers of substantially conical design seated within the said recesses and providing therewith cushioning means, and bolts passing radially through the felly and rim and having screw threaded connection with said washer.

3. The combination with the felly and rim of a vehicle wheel, of a tire therefor comprising a resilient tread body having a plurality of recesses on the inner periphery thereof and overlying the wheel rim, circumferential bands embedded within the resilient body and having apertures registering with the recesses therein, washers of substantially conical design seated within said registering apertures and providing therewith cushioning means, and bolts passing radially through the felly and rim and having screw threaded connection with said washers.

4. The combination with the felly and rim of a vehicle wheel, of a tire therefor comprising a resilient tread body having a plurality of recesses on the inner periphery thereof and overlying the wheel rim, circumferential reinforcing means embedded within the tread body and surrounding each of said recesses, washers seated within and closing the recesses and providing cushioning means therewith, and bolts passing radially through the felly and rim and having screw threaded connection with said washers.

In witness whereof I have hereunto set my hand in the presence of two witnesses.

EDWARD BRICE KILLEN.

Witnesses:
WILLIAM HENRY COTTINGTON,
ERNEST ARTHUR FISHWICK.